J. G. SCHNEIDER.
FILM PACK.
APPLICATION FILED DEC. 8, 1909.
1,009,794.
Patented Nov. 28, 1911.
2 SHEETS—SHEET 1.
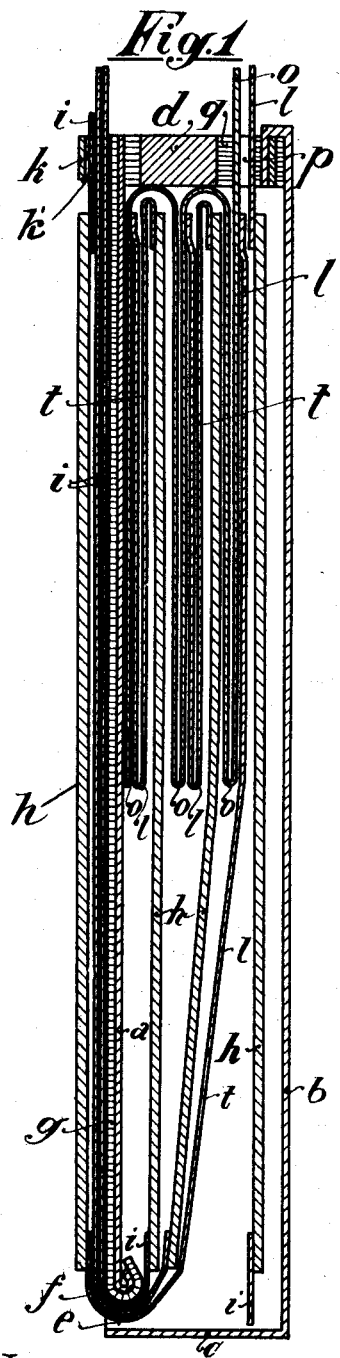
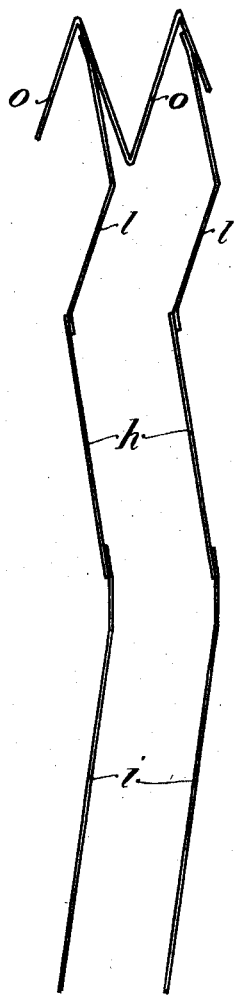
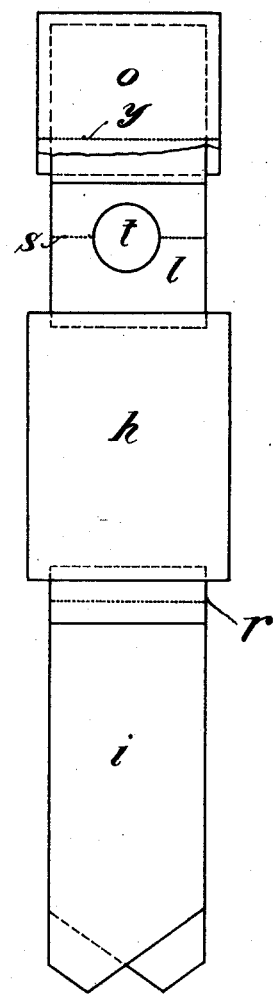
Inventor
Johann Georg Schneider J. G. SCHNEIDER.
FILM PACK.
APPLICATION FILED DEC. 8, 1909.
1,009,794.
Patented Nov. 28, 1911.
2 SHEETS—SHEET 2.
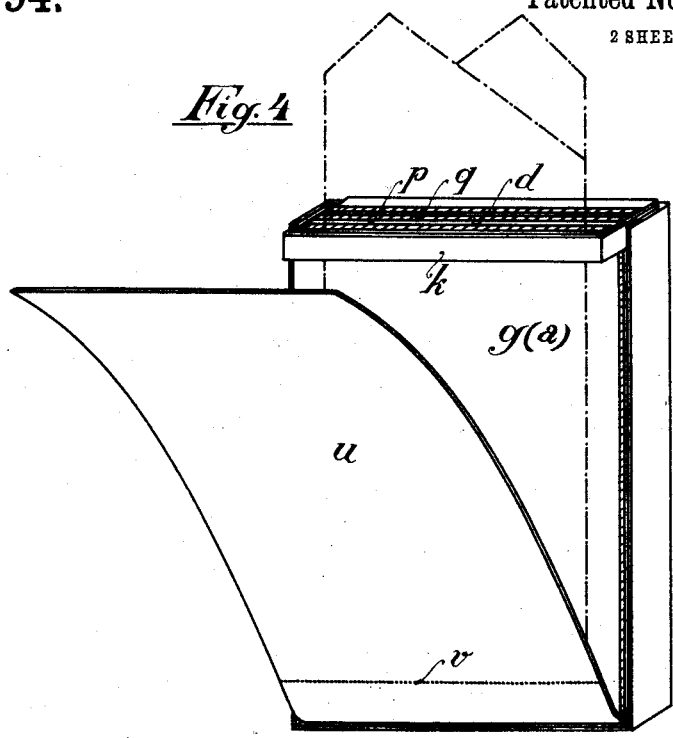
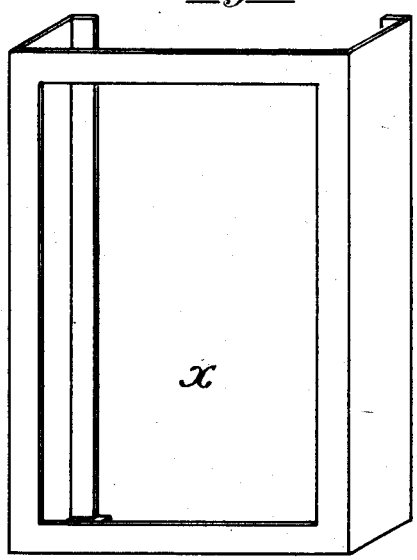
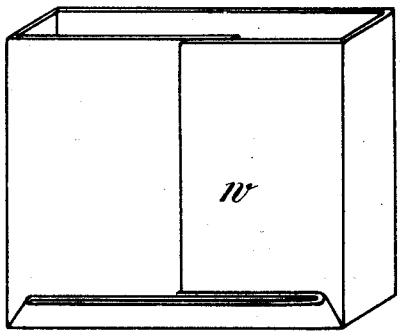
Witnesses
R. Goodstein
E. Schallinger
Inventor
Johann Georg Schneider
by B. Singer
Att'y

UNITED STATES PATENT OFFICE.

JOHANN GEORG SCHNEIDER, OF WÜRZBURG, GERMANY.

FILM-PACK.

1,009,794.

Specification of Letters Patent.  Patented Nov. 28, 1911.

Application filed December 8, 1909. Serial No. 532,112.

*To all whom it may concern:*

Be it known that I, JOHANN GEORG SCHNEIDER, a subject of the German Emperor, residing at Würzburg, in the Empire of Germany, have invented certain new and useful Improvements in Film - Packs, of which the following is a specification.

In ordinary film packs, the box for receiving the films is divided into rear and front chambers, in one of which the unexposed films are placed, while the films after exposure are drawn into the other by means of a film carrying band. Now this invention differs substantially from these ordinary film packs by the film box having only a single chamber, containing both the unexposed as well as the exposed films. In order in this arrangement to be able to expose the films and to return them into the box after exposure, carrying bands are provided at the upper and lower ends of the films.

An example of construction of the improved film pack is shown in the accompanying drawings, in which:—

Figure 1 is a longitudinal section of the film pack; Figs. 2 and 3, a side and front view respectively showing the way in which the films are connected with the carrying band and with the pull or draw band; Fig. 4 is a view of the film pack before use; Fig. 5, a frame in which the film pack is inserted before use; and Fig. 6, a case or sheath which serves for holding together the film pack before use.

The box which serves for receiving the films comprises a front wall $a$ and base plate $c$ the top wall $d$ and two lateral walls. The front wall $a$ does not extend entirely to the base plate $c$ but a slot $e$ is left between the lower end $f$ of the front wall and the base plate. The outer surface of the front wall preferably is provided with a layer of plush $g$ or with some other material which is adapted to exert a resilient pressure upon the objects adjacent to same. The film plates $h$ are disposed in this box before and after their exposure.

Each of the films carries at its lower end a means for pulling same in one direction and at the other end a means for pulling same in the other direction. These means are indicated by the reference characters $i$ and $l$ respectively, and in the embodiment shown they comprise bands, ribbons or such like. The bands $i$ extend through the slot $e$ and are brought over the edge $f$ of the front wall and closely adjacent to this front wall they pass through a frame $k$ on the top plate and are thereby held in position. The other bands $l$ are folded upon themselves and are disposed within the box, each of said bands $l$ is folded between the film to which it is attached and an adjacent film. The entire length of each of the bands $i$ and $l$ is somewhat more than the height of the box. A third band $o$ which is also folded upon itself is disposed within the box and one fold of the band $o$ is inserted between each band $l$ and a film $h$. The bands $l$ are attached to the common band $o$. One end of the band $o$ extends through a slot $p$ provided in the top plate $d$ of the box. This slot is lined with plush $f$ for the purpose of preventing rays of light entering into the interior of the box.

The following is the operation for exposing the films successively and for returning the same into the box: The first film adjacent to the rear wall $b$ is moved to the front of the box and outside of the same by means of the band $i$ attached thereon, one end of said band projecting through a slot $k'$ in frame $k$. The film $h$ passes through the slot $e$ at the bottom of the front wall and is conveyed into the position shown in Fig. 1, in which it is adjacent to the bands $i$ of those films which are still within the box. The band $i$ which served for moving the respective films from the box is then separated into two parts, a stub remaining in connection with the film. For this purpose this band is provided with a perforation $r$ adjacent to that edge at which it is attached to the film. By pulling the film in this direction, to wit, to the front of the box the band $l$ fastened to the other end of the film is pulled along, so that the fold between the moved film and the next film is straightened out. If the film after having been exposed is to be returned to the box band *o* which projects from the slot *p* is pulled and the band *l* therefore, together with the film is moved in opposite direction, to wit, into the box and toward the rear thereof. In this movement the fold of band *o* also is straightened out so that almost the entire length of the band *l* and a considerable portion of the band *o* projects through the slot *p*. The projecting ends of these bands are torn off and for this purpose these ends are provided with perforations *t* and *s*. The aperture *t* in band *l* facilitates the grasping of the adjacent band *o* for the purpose of pulling the same outwardly. The film after its exposure rests in the position shown in Fig. 1 near the rear wall of the box. If it is desired to expose the next film a pull is exerted on the band *i* of the next film and after the exposure the film is moved back into the box by exerting a pull on the projecting end of the band *o*. Each of the films carries even after the exposure a short portion of the band *l* projecting from the slot *p*. For the purpose of facilitating the separation of the bands *o* they are provided with apertures *x* which permit the penetration of the finger through the band *l*. Bands *i* are cut on the bias on their projecting ends and the direction of the slant is alternating, as shown in Fig. 3, for the purpose of facilitating the handling of the films before the exposure.

A sheet of black paper is preferably fastened to the base plate *c* and this sheet may be torn off before the use of the first film. For this purpose this protecting sheet *u* is provided with a perforated line *v*. A second envelop *w* is used for preventing the entrance of light to the film pack before the use of the same. This envelop is to be removed before insertion of the film pack in the camera. The pack may be used in combination with a frame or adapter *x* shown in Fig. 5. This frame is an accessory part which it is not necessary to provide with every pack of film, but which may be used with every pack after having been once inserted into the camera.

What I claim is—

1. In a film pack the combination of a box, a plurality of films in said box, means for displacing said films from the interior of the box to the outside thereof and flexible means attached to said films for returning the displaced film to the box.

2. In a film pack the combination of a box, a plurality of films in said box, means for displacing each of said films from the interior of the box to the outside thereof and flexible means attached to each of said films for returning the displaced film to the box.

3. In a film pack the combination of a box, a plurality of films in said box, flexible means for displacing each of said films from the interior of the box to the outside thereof and flexible means attached to said films for returning the displaced films to the box.

4. In a film pack the combination of a single chambered box, a plurality of films in said box, means for displacing each of said films from the interior of the box to the outside thereof and flexible means attached to said films for returning the displaced films to the box.

5. In a film pack the combination of a box, a plurality of films in said box, means for displacing the films successively from the interior of the box to the outside thereof, the displacing means for the undisplaced films being interposed between the displaced film and the undisplaced films, and means for returning a displaced film to the box.

6. In a film pack the combination of a box, a plurality of films within said box, means for displacing the films successively from the interior of the box to the outside thereof along one wall of the box, the means for displacing the undisplaced films and the wall of the box being interposed between the displaced film and the undisplaced films, and means for returning the displaced film to the box.

7. In a film pack the combination of a box, a plurality of films within said box, means associated with each film for moving the same from the interior of the box to the outside thereof and means for returning the same to the box, said last named means comprising elements attached to each film and an element connected with all of the first named elements.

8. In a film pack the combination of a box, a plurality of films in said box, a slot being left between a wall of said box and a base plate thereof, a band attached to one end of each film and extending through said slot, guiding means for said bands adjacent said wall, and a band attached to the other end of each film.

9. In a film pack the combination of a box, a plurality of films in said box, a slot being left between a wall of said box and a base plate thereof, a band attached to one end of each film and extending through said slot, guiding means for said bands adjacent said wall, a band attached to the other end of each film, and a third band attached to the ends of all of the second named bands.

10. In a film pack the combination of a box, a plurality of films in said box, means associated with one end of each film for displacing the same from the interior of the box to the outside thereof, a band attached to the other end of each film, another band attached to the ends of all of said first named bands, both of said bands being folded between said films before they are displaced.

11. In a film pack the combination of a box, a plurality of films in said box, bands attached to each end of each film for displacing the same from the box and for returning the same to the box, some of said bands being provided with apertures to facilitate handling of other bands.

JOHANN GEORG SCHNEIDER.

Witnesses:
  OSCAR BOCK,
  LEONHARD REINHARDT.

Copies of this patent may be obtained for five cents each, by addressing the "Commissioner of Patents, Washington, D. C."